United States Patent
Bickford et al.

(10) Patent No.: US 9,618,566 B2
(45) Date of Patent: Apr. 11, 2017

(54) SYSTEMS AND METHODS TO PREVENT INCORPORATION OF A USED INTEGRATED CIRCUIT CHIP INTO A PRODUCT

(71) Applicant: GLOBALFOUNDRIES INC., Grand Cayman (KY)

(72) Inventors: Jeanne P. Bickford, Essex Junction, VT (US); Nazmul Habib, South Burlington, VT (US); Baozhen Li, South Burlington, VT (US); Tad J. Wilder, South Hero, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 170 days.

(21) Appl. No.: 14/620,273

(22) Filed: Feb. 12, 2015

(65) Prior Publication Data
US 2016/0238653 A1 Aug. 18, 2016

(51) Int. Cl.
*G01R 31/28* (2006.01)
*G06F 21/57* (2013.01)
*H05K 13/08* (2006.01)

(52) U.S. Cl.
CPC ..... *G01R 31/2851* (2013.01); *G01R 31/2813* (2013.01); *G06F 21/575* (2013.01); *H05K 13/08* (2013.01)

(58) Field of Classification Search
CPC ............... H05K 13/08; G01R 31/2813; G01R 31/2851; G06F 21/73; G06F 17/5068;
(Continued)

(56) References Cited

U.S. PATENT DOCUMENTS 6,585,165 B1 7/2003 Kuroda et al.
8,015,514 B2 9/2011 Jaffe et al.
(Continued)

FOREIGN PATENT DOCUMENTS

EP 0430844 A3 6/1991
EP 2267630 A1 12/2010
(Continued)

OTHER PUBLICATIONS

Zhang et al., "Watermarking FPGA Bitfile for Intellectual Property Protection", Radio Engineering, vol. 21, No. 2, Jun. 2012, pp. 764-771.

*Primary Examiner* — Ali Neyzari
(74) *Attorney, Agent, or Firm* — Gibb & Riley, LLC; David A. Cain, Esq.

(57) ABSTRACT

In the systems and methods, an identifier is generated for a printed circuit board (PCB), chips are connected to the PCB, and corresponding sets of programmable bits on the chips are programmed to match specific sections of the identifier. Due to the generation of the identifier and the programming of the corresponding sets of programmable bits on the chips to match specific sections of the identifier, the validity of the chips can be verified at any time during product life. For example, for each chip, its set of programmable bits can be read and, then, a determination can be made as to whether that set of programmable bits is indeed programmed to match a specific section of the identifier. Operation of the PCB can be allowed when all the chips are determined to be valid and prohibited when any of the chips are determined to be invalid (e.g., previously used).

20 Claims, 4 Drawing Sheets

(58) Field of Classification Search
CPC .. G06F 11/006; G06F 12/1466; G06F 21/575; G06F 21/78; G06F 21/74; H04L 9/30
USPC .............................. 340/5.8; 713/2; 711/163
See application file for complete search history.

(56) References Cited

U.S. PATENT DOCUMENTS

| | | | |
|---|---|---|---|
| 8,112,618 B2 * | 2/2012 | Brokish | G06F 21/575 713/1 |
| 8,384,081 B2 | 2/2013 | Yamazaki et al. | |
| 8,479,261 B2 | 7/2013 | Byers et al. | |
| 8,775,811 B2 | 7/2014 | Marking et al. | |
| 8,797,139 B2 * | 8/2014 | Lim | G06F 21/73 340/10.5 |
| 8,918,611 B2 * | 12/2014 | Ito | G06F 12/1466 711/100 |
| 2011/0246707 A1 | 10/2011 | Ito | |
| 2013/0222109 A1 | 8/2013 | Lim | |
| 2014/0044265 A1 | 2/2014 | Kocher et al. | |

FOREIGN PATENT DOCUMENTS

| | | |
|---|---|---|
| WO | 02/069281 A2 | 9/2002 |
| WO | 2006/064921 A2 | 6/2006 |

* cited by examiner

FIG. 4

SYSTEMS AND METHODS TO PREVENT INCORPORATION OF A USED INTEGRATED CIRCUIT CHIP INTO A PRODUCT

BACKGROUND

The present disclosure relates to product reliability and, more particularly, to systems and methods to prevent incorporation of a previously used integrated circuit chip into a product, either initially or during printed circuit board (PCB) rework, in order to ensure product reliability.

More particularly, oftentimes previously used integrated circuit chips are accidently or surreptitiously incorporated into products, either initially or during printed circuit board (PCB) rework (e.g., when a faulty integrated circuit chip on a printed circuit board (PCB) within the product is removed for repair or replacement). Such used integrated circuit chips create functionality and reliability issues because there is no way of tracking whether the used integrated circuit chip has exceeded its expected useful life. This is of particular concern when the product into which the used integrated circuit chip is incorporated is a life critical product (e.g., if the product has a medical or military function). Current schemes rely on strict access control over integrated circuit supply and are not always effective.

SUMMARY

Disclosed herein is a system that prevents incorporation of a previously used integrated circuit chip into a product, either initially or during printed circuit board (PCB) rework, in order to ensure product reliability. The system can comprise the product and, incorporated into that product: a memory; a printed circuit board (PCB) comprising multiple integrated circuit chips, having corresponding sets of programmable bits; and, a processor electrically connected to the memory and to the multiple integrated circuit chips. The memory can store a table, which associates specific sections of an identifier for the printed circuit board with specific integrated circuit chips on the printed circuit board. The processor can access the memory and can use the table in order to verify the validity of all of the multiple integrated circuit chips on the PCB. Specifically, for each specific integrated circuit chip on the printed circuit board, the processor can perform the following. The processor can read the corresponding set of programmable bits on the specific integrated circuit chip. The processor can then determine whether the corresponding set of programmable bits of that specific integrated circuit chip is indeed programmed to match a specific section of the identifier, as indicated by the table. If so, the specific integrated circuit chip can be considered valid. If not, the specific integrated circuit chip can be considered invalid. Such processes can be repeated by the processor for each of the integrated circuit chips on the PCB and the processor can either allow operation of the PCB, when all of the multiple integrated circuit chips are determined to be valid, or prevent (i.e., prohibit) operation of the printed circuit board, when any of the multiple integrated circuit chips are determined to be invalid.

Also disclosed herein is another system that prevents incorporation of a previously used integrated circuit chip into a product, either initially or during printed circuit board (PCB) rework, in order to ensure product reliability. This system can comprise the product and a printed circuit board (PCB) incorporated into that product. In this case, the printed circuit board can comprise multiple integrated circuit chips with one of these multiple integrated circuit chips being a supervising microprocessor chip that is electrically connected to all others of the multiple integrated circuit chips. The multiple integrated circuit chips, including the supervising microprocessor chip, can comprise corresponding sets of programmable bits. The supervising microprocessor chip can further comprise an additional set of programmable bits, which are programmed with an identifier for the PCB. This supervising microprocessor chip can verify the validity of all of the multiple integrated circuit chips on the PCB. Specifically, for each specific integrated circuit chip on the PCB, the supervising microprocessor chip can perform the following. The supervising microprocessor chip can read the corresponding set of programmable bits on the specific integrated circuit chip. The supervising microprocessor chip can then determine whether the corresponding set of programmable bits of that specific integrated circuit chip is indeed programmed to match a specific section of the identifier. If so, the specific integrated circuit chip can be considered valid. If not, the specific integrated circuit chip can be considered invalid. Such processes can be repeated by the supervising microprocessor chip for each of the integrated circuit chips on the PCB and the supervising microprocessor chip can either allow operation of the PCB, when all of the multiple integrated circuit chips are determined to be valid, or prevent (i.e., prohibit) operation of the printed circuit board, when any of the multiple integrated circuit chips are determined to be invalid.

Also disclosed herein are various methods that prevent incorporation of a previously used integrated circuit chip into a product, either initially or during printed circuit board (PCB) rework, in order to ensure product reliability. These methods can comprise providing a product, which comprises a printed circuit board (PCB). This PCB can comprise multiple integrated circuit chips and the multiple integrated circuit chips can comprise corresponding sets of programmable bits. The methods can further comprise verifying the validity of all of the multiple integrated circuit chips on the PCB by performing the following, for each specific integrated circuit chip on the printed circuit board: reading a corresponding set of programmable bits on the specific integrated circuit chip; and, then determining whether the corresponding set of programmable bits has been programmed to match a specific section of an identifier of the printed circuit board. If so, the specific integrated circuit chip can be considered valid. If not, the specific integrated circuit chip can be considered invalid. These processes can be repeated in order to determine the validity of each the integrated circuit chips on the PCB. The methods can further comprise allowing operation of the PCB when all of the multiple integrated circuit chips are determined to be valid or preventing (i.e., prohibiting) operation of the printed circuit board when any of the multiple integrated circuit chips are determined to be invalid.

It should be noted that the methods disclosed herein can correspond to the above-described systems such that the method steps and, particularly, the processes of verifying the validity of all of the multiple integrated circuit chips on the PCB and allowing or preventing operation of the PCB are performed either by a processor incorporated into the product separate from the PCB or by one of the multiple integrated circuit chips mounted on the PCB (i.e., by a supervisory microprocessor chip mounted on the PCB).

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, oftentimes previously used integrated circuit chips are accidently or surreptitiously incorporated into products, either initially or during printed circuit board (PCB) rework (e.g., when a faulty integrated circuit chip mounted on a PCB within the product is removed for repair or replacement). Such used integrated circuit chips create functionality and reliability issues because there is no way of tracking whether the used integrated circuit chip has exceeded its expected useful life. This is of particular concern when the product into which the used integrated circuit chip is incorporated is a life critical product (e.g., if the product has a medical or military function). Current schemes rely on strict access control over integrated circuit supply and are not always effective.

In view of the foregoing, disclosed herein are systems and methods that prevent incorporation of a previously used integrated circuit chip into a product, either initially or during printed circuit board (PCB) rework, in order to ensure product reliability. In these systems and methods, an identifier can be generated for a printed circuit board (PCB), integrated circuit chips can be electrically connected to the PCB, and corresponding sets of programmable bits on the integrated circuit chips can be programmed to match specific sections of the identifier. Due to the generation of the identifier for the PCB and the programming of the corresponding sets of programmable bits on the integrated circuit chips to match specific sections of the identifier, the validity of the integrated circuit chips can be verified at any time during the life of a product that incorporates the PCB. For example, for each specific integrated circuit chip, its set of programmable bits can be read (e.g., by a processor also incorporated into the product separate from the PCB or by a supervisory microprocessor chip also on the PCB, depending upon the embodiment) and, then, a determination can be made as to whether that set of programmable bits is indeed programmed to match a specific section of the identifier. Operation of the PCB can be allowed when all of the multiple integrated circuit chips are determined to be valid and prohibited when any of the integrated circuit chips are determined to be invalid.

Figure 1:
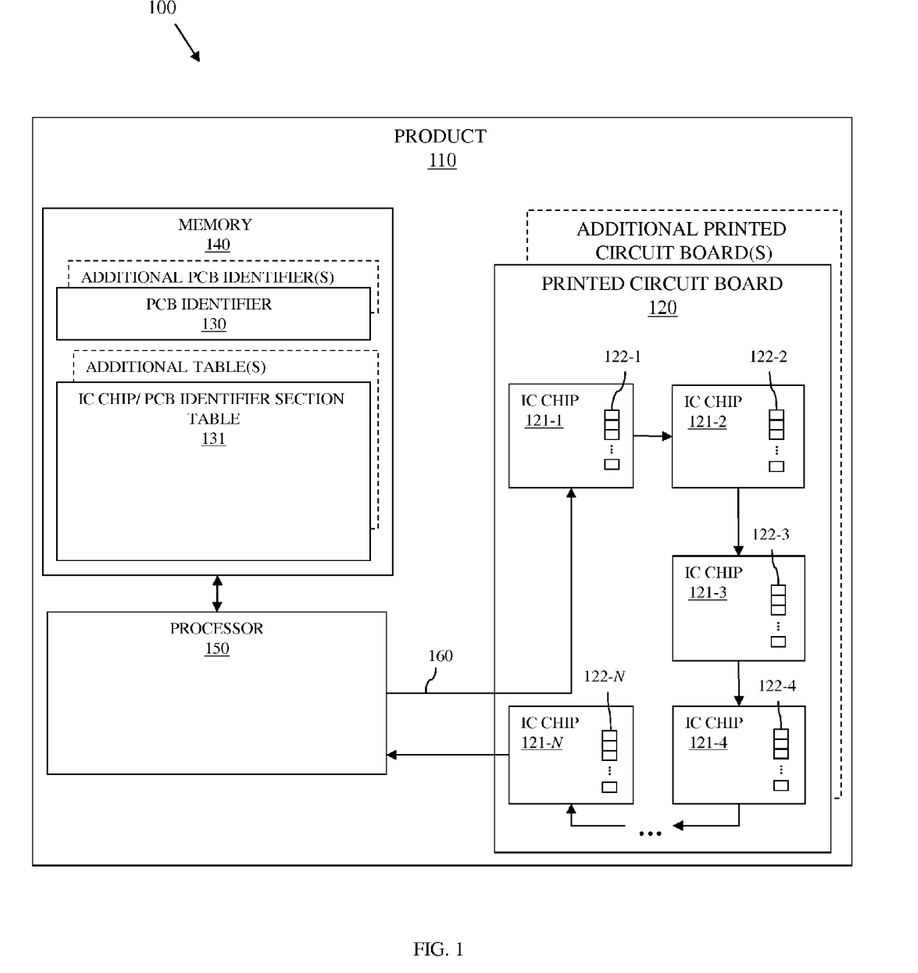
FIG. 1 is a schematic diagram illustrating a system that prevents incorporation of a previously used integrated circuit chip into a product in order to ensure product reliability.

More particularly, disclosed herein is a system 100 that prevents incorporation of a previously used integrated circuit chip into a product 110, either initially or during printed circuit board (PCB) rework, in order to ensure product reliability. The system 100 can comprise the product 110 and, incorporated into that product 110: a memory 140; at least one printed circuit board (PCB) 120 (e.g., a motherboard or other PCB) having at least one integrated circuit chip (e.g., see multiple integrated circuit chips 121-1 to 121-N) mounted thereon; and, a processor 150, which is a component of the product 110 and separate from the PCB 120.

The processor 150 can be electrically connected to and, particularly, in communication with the memory 140. The processor 150 can also be electrically connected to the PCB 120 and, particularly, to each of the integrated circuit chips 121-1 to 121-N on the PCB 120 (e.g., through a serial bus 160 (as shown) or directly through discrete buses (not shown)). For purposes of illustration, five integrated circuit chips are shown on the PCB 120. However, it should be understood that FIG. 1 is not intended to be limiting and any number of one or more integrated circuit chips can be mounted on the PCB 120 and connected to the processor 150 (e.g., by a bus 160).

The product 110 can, for example, be any end product. For purposes of this disclosure, an end product can be any product that comprises a PCB with integrated circuit chip(s) mounted thereon, a memory, a processor, etc. Such end products can, for example, range from toys and other low-end applications to advanced computer products having a display, a keyboard or other input device, a central processing unit (CPU), etc.

In any case, prior to or during PCB assembly for the product 110, the PCB 120 can be assigned a unique PCB identifier 130. This PCB identifier 130 can be a random number. This random number can be generated, for example, by a random number generator and can comprise multiple digits up to a predetermined place number (i.e., a set number of places).

Also, prior to or during PCB assembly, specific sections of the PCB identifier 130 (with a lesser predetermined place number) can be assigned (e.g., in sequence) to each of the integrated circuit chips 121-1 to 121-N on the PCB 120. For example, the first x number of digits in the PCB identifier 130 can be assigned to the first integrated circuit chip 121-1 on the PCB 120, the second x number of digits in the PCB identifier 130 can be assigned to the second integrated circuit chip 121-2 on the PCB 120, and so on. It should be understood that the predetermined place number for the PCB identifier 130 must be a place number that is sufficiently large enough to allow section assignment to each of the integrated circuit chips. In any case, each digit in the random number of the PCB identifier 130 can be a binary digit. Alternatively, each digit in the random number of the PCB identifier 130 can comprise a non-binary digit (e.g., 0-9).

The memory 140 can comprise, for example, a non-volatile memory. This memory 140 can, optionally, store the PCB identifier 130. The memory 140 can also store an integrated circuit chip/PCB identifier section table 131. This table 131 can associate the specific sections of the PCB identifier 130 with the specific integrated circuit chips 121-1 to 121-N on the PCB 120, as assigned.

Each of the integrated circuit chips 121-1 to 121-N mounted on the PCB 120 can be in the form of a bare integrated circuit chip (i.e., a bare die) or in the form of a packaged integrated circuit chip (i.e., a chip module). Each of the integrated circuit chips 121-1 to 121-N can, for example, have different functions within the product 110. Regardless of those functions, the integrated circuit chips 121-1 to 121-N can have corresponding sets 122-1 to 122-N of programmable bits. Such programmable bits can specifically comprise single-use programmable bits that, once programmed, cannot be re-programmed. Exemplary single-use programmable bits include, but are not limited to, fuses and anti-fuses.

Ideally, each specific set 122-1 to 122-N of programmable bits on each specific integrated circuit chip 121-1 to 121-N will have been programmed (e.g., during PCB assembly) to match the specific section of the PCB identifier 130 that was previously assigned to that specific integrated circuit chip 121-1 to 121-N. Those skilled in the art will recognize that in the case of a set of fuses such programming involves blowing certain ones of the fuses in the set (i.e., breaking the electrical connection in certain ones of the fuses in the set), thereby changing the value of those fuses, when read, from a first value (e.g., a "0" value) to a second value (e.g., a "1" value). Contrarily, in the case of a set of anti-fuses such programming involves breaking down dielectric material in certain ones of the anti-fuses in the set to establish an electrical connection, thereby changing the values of those anti-fuses, when read, from a first value (e.g., a "1" value) to a second value (e.g., a "0" value). Additionally, those skilled in the art will recognize that, if the digits in the PCB identifier 130 are binary digits, each programmable bit (i.e., each fuse, anti-fuse, or other suitable programmable bit) within the set of programmable bits on an integrated circuit chip can correspond to a specific digit in the the section of the PCB identifier 130 assigned to that integrated circuit chip. However, if the digits in the PCB identifier 130 are non-binary digits (e.g., 0-9), groups of programmable bits (i.e., groups of fuses, anti-fuses or other suitable programmable bits) within the set of programmable bits on an integrated circuit chip can correspond to a specific digit in the section of the PCB identifier 130 assigned to that integrated circuit chip so that, when the values of a group of programmable bits corresponding to the specific digit are read, those values indicate the total value of the non-binary digit in the PCB identifier 130.

As discussed above, oftentimes previously used integrated circuit chips are accidently or surreptitiously incorporated into a product, either initially or during printed circuit board (PCB) rework. In order to prevent operation of the product 110 with a previously used integrated circuit chip, the system 100 disclosed herein is configured to use the processor 150 to verify (e.g., automatically or on-demand) the validity of the integrated circuit chips 121-1 to 121-N one or more times during the product's useful life. More specifically, the processor 150 can access the memory 140 and can use the table 131 in order to verify the validity of all of the multiple integrated circuit chips 121-1 to 121-N on the PCB 120. Such verification can be performed automatically, for example, whenever the product 110 is powered on, whenever the PCB 120 is power-on, at a set number of power-on-hours (POHs) of either the product 110 or the PCB 120, etc. Alternatively, it can be performed on-demand (e.g., in response to a command input by a user through a user interface of the product).

In any case, the processor 150 can perform (i.e., can be adapted to perform, can be configured to perform, can execute a program of instructions to perform, etc.) verification of the validity of all of the multiple integrated circuit chips 121-1 to 121-N on the PCB 120 using the integrated circuit chip/PCB identifier section table 131 as follows. For each specific integrated circuit chip on the PCB 120, the processor 150 can read the corresponding set of programmable bits on the specific integrated circuit chip. The processor 150 can then determine whether or not the corresponding set of programmable bits of that specific integrated circuit chip is indeed programmed to match a specific section of the identifier, as indicated by the integrated circuit chip/PCB identifier section table 131 (i.e., by comparing the values read from the corresponding set of programmable bits to the section of the PCB identifier assigned to the specific integrated circuit chip, as indicated in the table 131, to see if they match). If so, the specific integrated circuit chip can be considered valid. If not, the specific integrated circuit chip can be considered invalid. This verification process can be repeated by the processor 150 for each of the integrated circuit chips 121-1 to 121-N on the PCB 120. That is, the processor 150 can read the set of programmable bits 122-1 on integrated circuit chip 121-1 and can perform a comparison process to determine whether or not that set of programmable bits 122-1 is indeed programmed to match the section of the PCB identifier 130 (e.g., the first x number of digits of the PCB identifier 130) that was assigned to the integrated circuit chip 121-1, as indicated by the integrated circuit chip/PCB identifier section table 131. If so, the integrated circuit chip 121-1 can be considered valid. If not, the integrated circuit chip 121-1 can be considered invalid. Next, the processor 150 can read the set of programmable bits 122-2 on integrated circuit chip 121-2 and can perform a comparison process to determine whether or not that set of programmable bits 122-2 is indeed programmed to match the section of the PCB identifier 130 (e.g., the second x number of digits of the PCB identifier 130) that was assigned to the integrated circuit chip 121-2, as indicated by the table integrated circuit chip/PCB identifier section table 131. If so, the integrated circuit chip 121-2 can be considered valid. If not, the integrated circuit chip 121-2 can be considered invalid. Next, the processor 150 can read the set of programmable bits 122-3 on integrated circuit chip 121-3 and can perform a comparison process to determine whether or not that set of programmable bits 122-3 is indeed programmed to match the section of the PCB identifier 130 (e.g., the third x number of digits of the PCB identifier 130) that was assigned to the integrated circuit chip 121-3, as indicated by the integrated circuit chip/PCB identifier section table 131, and so on.

When all of the multiple integrated circuit chips 121-1 to 121-N on the PCB 120 are determined to be valid, the processor 150 can allow operation of the PCB 120. However, when any of the multiple integrated circuit chips 121-1 to 121-N on the PCB 120 are determined to be invalid, the processor 150 can prevent (i.e., can prohibit) operation of the PCB 120 and, optionally, can notify a user of the invalid integrated circuit chip(s). Notification of invalid integrated circuit chip(s) can, for example, be generated locally at the product itself (e.g., a message on graphic user interface (GUI) of the product). Alternatively, notification of invalid integrated circuit chip(s) can be communicated (e.g., over local area network or wide area) to a remote system administrator.

It should be understood that PCB 120 incorporated into the product 110 can be reworked over the course of the product life and, particularly, any of the integrated circuit chips on the PCB 120 can be replaced, if necessary (e.g., if faulty). Thus, for example, the PCB 120 can at some point during the product life comprise a replacement integrated circuit chip (e.g., integrated circuit chip 121-3), which was mounted on the PCB 120 during a PCB rework process after the initial PCB assembly and which replaced a previously removed integrated circuit chip (e.g., a faulty integrated circuit chip) at the same location on the PCB 120. As discussed in detail below with regard to the method, the PCB rework process can be performed so as to ensure that the replacement integrated circuit chip and the previously removed integrated circuit chip have matching programmed sets of programmable bits (which, in turn, match the correct specific section of the PCB identifier 130, as indicated by the integrated circuit chip/PCB identifier section table 131), thereby ensuring that the replacement integrated circuit chip is not a previously used integrated circuit chip and ensuring that the replacement integrated circuit chip passes subsequent validity verification processes.

Additionally, it should be understood that in this system 100, the product 110 can further incorporate additional PCBs configured in the same manner as the PCB 120, described above, each with one or more integrated circuit chips having corresponding sets of programmable bits. In this case, the memory 140 can further store additional PCB identifiers (optional) and additional integrated circuit chip/PCB identifier section tables for each integrated circuit chip and the processor 150 can be electrically connected to the multiple integrated circuit chips on the additional PCBs (e.g., through additional serial buses) and can perform the above-described processes to verify the validity of the integrated circuit chips on the additional PCB using the additional integrated circuit chip/PCB identifier section tables.

It should further be understood that this system 100, not only prevents previously used integrated circuit chips from being accidently or surreptitiously mounted on a PCB of a product during PCB rework, but also prevents a previously used PCB from being accidently or surreptitiously incorporated into the product 110 itself during product rework. That is, during product rework, a new printed circuit board (new PCB) can be used to replace a faulty PCB and/or simply added to the product 110 design and this new PCB can be assigned a new PCB identifier. For example, as mentioned above, the memory 140 can store multiple PCB identifiers, including unassigned PCB identifiers, and the new PCB identifier can be selected from the unassigned PCB identifiers. Alternatively, a new PCB identifier can be generated (e.g., by the processor) and stored in the memory 140. In any case, this new PCB identifier can be assigned to the new PCB. Once the new PCB identifier is assigned to the new PCB, specific integrated circuit chips on the new PCB can be further assigned specific sections of the new PCB identifier and a new integrated circuit chip/PCB identifier section table can further be generated and stored in the memory 140.

Figure 2:
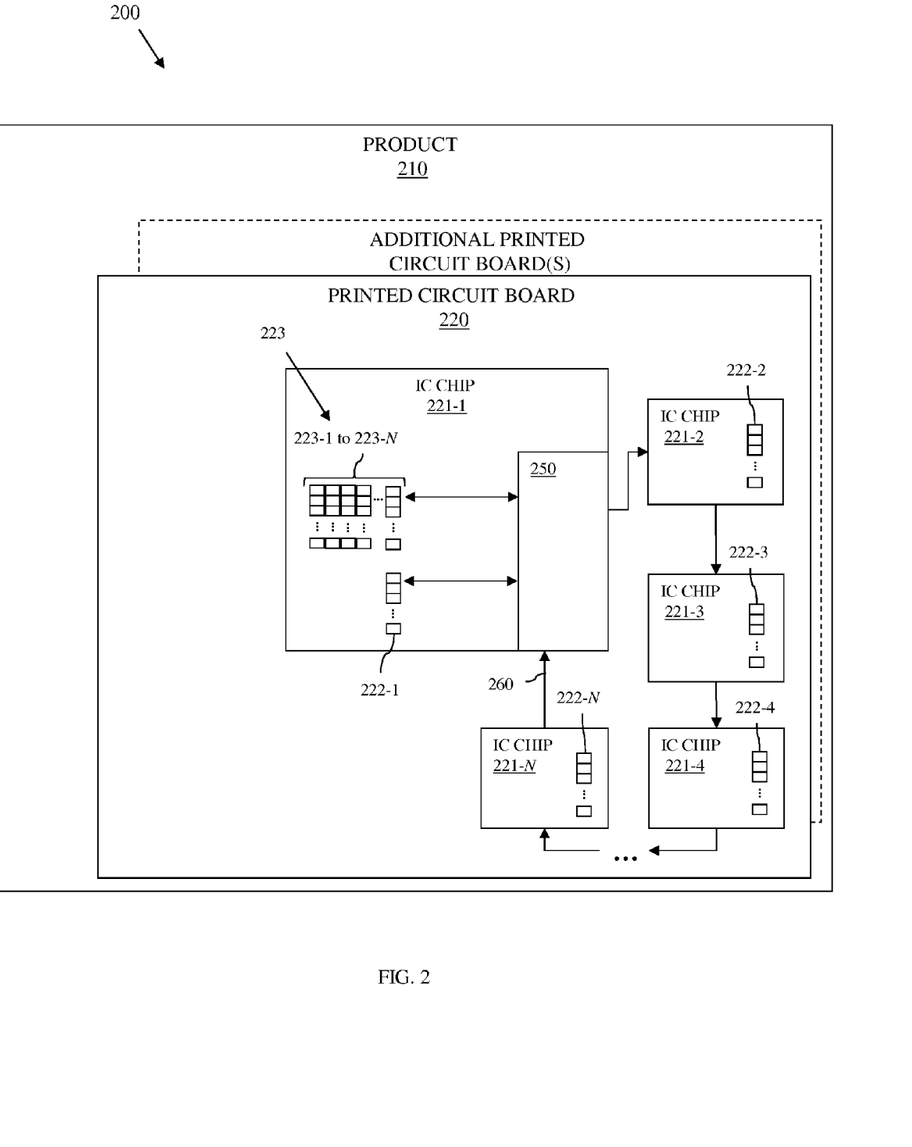
FIG. 2 is a schematic diagram illustrating another system that prevents incorporation of a previously used integrated circuit chip into a product in order to ensure product reliability.

Referring to FIG. 2, also disclosed herein is another system 200 that similarly prevents incorporation of a previously used integrated circuit chip into a product 210, either initially or during printed circuit board (PCB) rework, in order to ensure product reliability. This system 200 can comprise the product 210 and a printed circuit board (PCB) 220 (e.g., a motherboard or other PCB) incorporated into that product 210. In this system 200, unlike the system 100, the validity verification process is performed by a supervising microprocessor chip mounted on the PCB 220, as opposed to a processor incorporated into the product 210 and separate from the PCB 220. More specifically, the PCB 220 can comprise multiple integrated circuit chips 221-1 to 221-N mounted thereon with one of the multiple integrated circuit chips (e.g., IC chip 221-1) being a supervising microprocessor chip that is electrically connected to all others of the integrated circuit chips (e.g., IC chips 221-2 to 221-N) through, for example, a serial bus 260 (as shown) or directly through discrete buses (not shown). For purposes of illustration, five integrated circuit chips are shown on the PCB 220. However, it should be understood that FIG. 2 is not intended to be limiting and any number of two or more integrated circuit chips can be mounted on the PCB 220 with one of the two or more integrated circuit chips being a supervising microprocessor chip electrically connected to all of the other integrated circuit chips (e.g., by a bus 260).

The product 210 can, for example, be any end product. For purposes of this disclosure, an end product can be any product that comprises at least one PCB with integrated circuit chips mounted thereon. Such end products can, for example, range from toys and other low-end applications to advanced computer products having a display, a keyboard or other input device, a central processing unit (CPU), etc.

In any case, prior to or during PCB assembly, the PCB 220 can be assigned a unique PCB identifier. This PCB identifier can be a random number. This random number can be generated, for example, by a random number generator and can comprise multiple digits up to a predetermined place number (i.e., a set number of places).

Also, prior to or during PCB assembly, specific sections of the PCB identifier (with a lesser predetermined place number) can be assigned (e.g., in sequence) to each of the multiple integrated circuit chips 221-1 to 221-N on the PCB 220, including to the supervising microprocessor chip 221-1. For example, the first x number of digits in the PCB identifier can be assigned to the first integrated circuit chip 221-1 (i.e., to the supervising microprocessor chip) on the printed circuit board (PCB) 220, the second x number of digits in the identifier can be assigned to the second integrated circuit chip 221-2, and so on. It should be understood that the predetermined place number for the PCB identifier must be a place number that is sufficiently large enough to allow section assignment to each of the integrated circuit chips. In any case, each digit in the random number of the printed circuit board identifier can be a binary digit. Alternatively, each digit in the random number of the PCB identifier can comprise a non-binary digit (e.g., 0-9).

The multiple integrated circuit chips 221-1 to 221-N mounted on the PCB 220 can be in the form of bare integrated circuit chips (i.e., bare dice) or in the form of packaged integrated circuit chips (i.e., chip modules). The multiple integrated circuit chips 221-1 to 221-N can have various different functions within the product 210. Regardless of those functions, all the multiple integrated circuit chips 221-1 to 221-N, including the supervising microprocessor chip 221-1, can have corresponding sets 222-1 to 222-N of programmable bits. The supervising microprocessor chip 221-1 can further comprise an additional set 223 of programmable bits. Such programmable bits can specifically comprise single-use programmable bits that, once programmed, cannot be re-programmed. Exemplary single-use programmable bits include, but are not limited to, fuses and anti-fuses.

The additional set 223 of programmable bits on the supervising microprocessor chip 221-1 can be programmed (e.g., during PCB assembly) with the PCB identifier. That is, the PCB identifier is hard-programmed onto the supervising microprocessor chip 221-1. Ideally, each specific set of programmable bits 222-1 to 222-N on each specific integrated circuit chip 221-1 to 221-N will also be programmed (e.g., during PCB assembly) to match the specific section of the PCB identifier that was assigned to that specific integrated circuit chip (e.g., see the sub-sets 223-1 to 223-N of the additional set 223 of the programmable bits, which correspond to the different sections of the PCB identifier that were assigned to the specific integrated circuit chips 221-1 to 221-N in sequence). Those skilled in the art will recognize that in the case of a set of fuses such programming involves blowing certain ones of the fuses in the set (i.e., breaking the electrical connection in certain ones of the fuses in the set), thereby changing the value of those fuses, when read, from a first value (e.g., a "0" value) to a second value (e.g., a "1" value). Contrarily, in the case of a set of anti-fuses such programming involves breaking down dielectric material in certain ones of the anti-fuses in the set to establish an electrical connection, thereby changing the values of those anti-fuses, when read, from a first value (e.g., a "1" value) to a second value (e.g., a "0" value). Additionally, those skilled in the art will recognize that, if the digits in the PCB identifier are binary digits, each programmable bit (i.e., each fuse, anti-fuse or other suitable programmable bit) within the set of programmable bits on an integrated circuit chip can correspond to a specific digit in the the section of the PCB identifier assigned to that integrated circuit chip. However, if the digits in the PCB identifier are non-binary digits (e.g., 0-9), groups of programmable bits (i.e., groups of fuses, anti-fuses or other suitable programmable bits) within the set of programmable bits on an integrated circuit chip can correspond to a specific digit in the section of the PCB identifier assigned to that integrated circuit chip so that, when the values of a group of programmable bits corresponding to the specific digit are read, those values indicate the total value of the non-binary digit in the PCB identifier.

As discussed above, oftentimes previously used integrated circuit chips are accidently or surreptitiously incorporated into a product, either initially or during printed circuit board (PCB) rework. In order to prevent operation of the product 210 with a previously used integrated circuit chip, the system 200 disclosed herein is configured to use the supervising microprocessor chip 221-1 to verify the validity of all of the integrated circuit chips 221-1 to 221-N one or more times during the product's useful life. Such verification can be performed automatically, for example, whenever the product 210 is powered on, whenever the PCB 220 is power-on, at a set number of power-on-hours (POHs) of either the product 210 or the PCB 220, etc. Alternatively, it can be performed on-demand (e.g., in response to a command input by a user through a user interface of the product).

In any case, the supervising microprocessor chip 221-1 can perform (i.e., can be adapted to perform, can be configured to perform, can execute a program of instructions to perform, etc.) verification of the validity of all of the multiple integrated circuit chips 221-1 to 221-N on the PCB 220, including the supervising microprocessor chip 221-1 itself, using the previously programmed additional set 223 of programmable bits as follows. For each specific integrated circuit chip on the PCB 220, the supervising microprocessor chip 221-1 can read the corresponding set of programmable bits on the specific integrated circuit chip and the additional set 223 of programmable bits and can determine whether or not the corresponding set of programmable bits is indeed programmed to match a specific section of the PCB identifier, as indicated by a specific sub-set of programmable bits in the additional set 223 of programmable bits (i.e., by comparing the values read from the corresponding set of programmable bits to the values read from the specific sub-set of programmable bits in the additional set 223 of programmable bits). If so, the specific integrated circuit chip can be considered valid. If not, the specific integrated circuit chip can be considered invalid. This verification process can be repeated by the supervising microprocessor chip 221-1 for each of the integrated circuit chips 221-1 to 221-N on the PCB 220. That is, the supervising microprocessor chip 221-1 can read its own set of programmable bits 222-1 and its additional set 223 of programmable bits and can perform a comparison process to determine whether or not the set of programmable bits 222-1 is indeed programmed to match the section of the PCB identifier that was assigned to the integrated circuit chip 221-1, as indicated by the first sub-set 223-1 of programmable bits in the additional set 223 (i.e., as indicated by the first x number of digits programmed into the additional set 223). If so, the integrated circuit chip 221-1 can be considered valid. If not, the integrated circuit chip 221-1 can be considered invalid. Next, the supervising microprocessor chip 221-1 can read the set of programmable bits 222-2 on integrated circuit chip 221-2 and the additional set 223 of programmable bits and can perform a comparison process to determine whether or not the set of programmable bits 222-2 is indeed programmed to match the section of the PCB identifier that was assigned to the integrated circuit chip 221-2, as indicated by the second sub-set 223-2 of programmable bits in the additional set 223 (i.e., as indicated by the second x number of digits programmed into the additional set 223). If so, the integrated circuit chip 221-2 can be considered valid. If not, the integrated circuit chip 221-2 can be considered invalid. Next, the supervising microprocessor chip 221-1 can read the set of programmable bits 222-3 on integrated circuit chip 221-3 and the additional set 223 of programmable bits and can perform a comparison process to determine whether or not the set of programmable bits 222-3 is indeed programmed to match the section of the PCB identifier that was assigned to the integrated circuit chip 221-3, as indicated by third sub-set 223-3 of programmable bits in the additional set 223 (i.e., as indicated by the third x number of digits programmed into the additional set 223), and so on.

When all of the multiple integrated circuit chips 221-1 to 221-N on the PCB 220 are determined to be valid, the supervising microprocessor chip 221-1 can allow operation of the PCB 220. However, when any of the multiple integrated circuit chips 221-1 to 221-N on the PCB 220 are determined to be invalid, the supervising microprocessor chip 221-1 can prevent (i.e., can prohibit) operation of the PCB 220 and, optionally, can notify a user of the invalid integrated circuit chip(s). Notification of invalid integrated circuit chip(s) can, for example, be generated locally at the product itself (e.g., a message on graphic user interface (GUI) of the product). Alternatively, notification of invalid integrated circuit chip(s) can be communicated (e.g., over local area network or wide area) to a remote system administrator.

It should be understood that the PCB 220 incorporated into the product 210 can be reworked over the course of the product life and, particularly, any of the integrated circuit chips on the PCB 220 can be replaced, if necessary (e.g., if faulty). Thus, for example, the PCB 220 can at some point during the product life comprise a replacement integrated circuit chip (e.g., integrated circuit chip 221-3), which was mounted on the PCB 220 during a PCB rework process after the initial PCB assembly and which replaced a previously removed integrated circuit chip (e.g., a faulty integrated circuit chip) at the same location. As discussed in detail below with regard to the method, the PCB rework process can be performed so as to ensure that the replacement integrated circuit chip and the previously removed integrated circuit chip have matching programmed sets of programmable bits (which, in turn, match the correct specific section of the PCB identifier, as indicated by the sub-set 223-3 of programmable bits of the additional set 223 of programmable bits on the supervising microprocessor chip 221-1), thereby ensuring that the replacement integrated circuit chip is not a previously used integrated circuit chip and ensuring that the replacement integrated circuit chip passes subsequent validity verification processes. Additionally, it should be understood that in this system 200, the product 210 can further incorporate additional PCBs configured in the same manner as the PCB 220, described above, to allow the validity of any integrated circuits chips mounted thereon to be verified.

Figure 3:
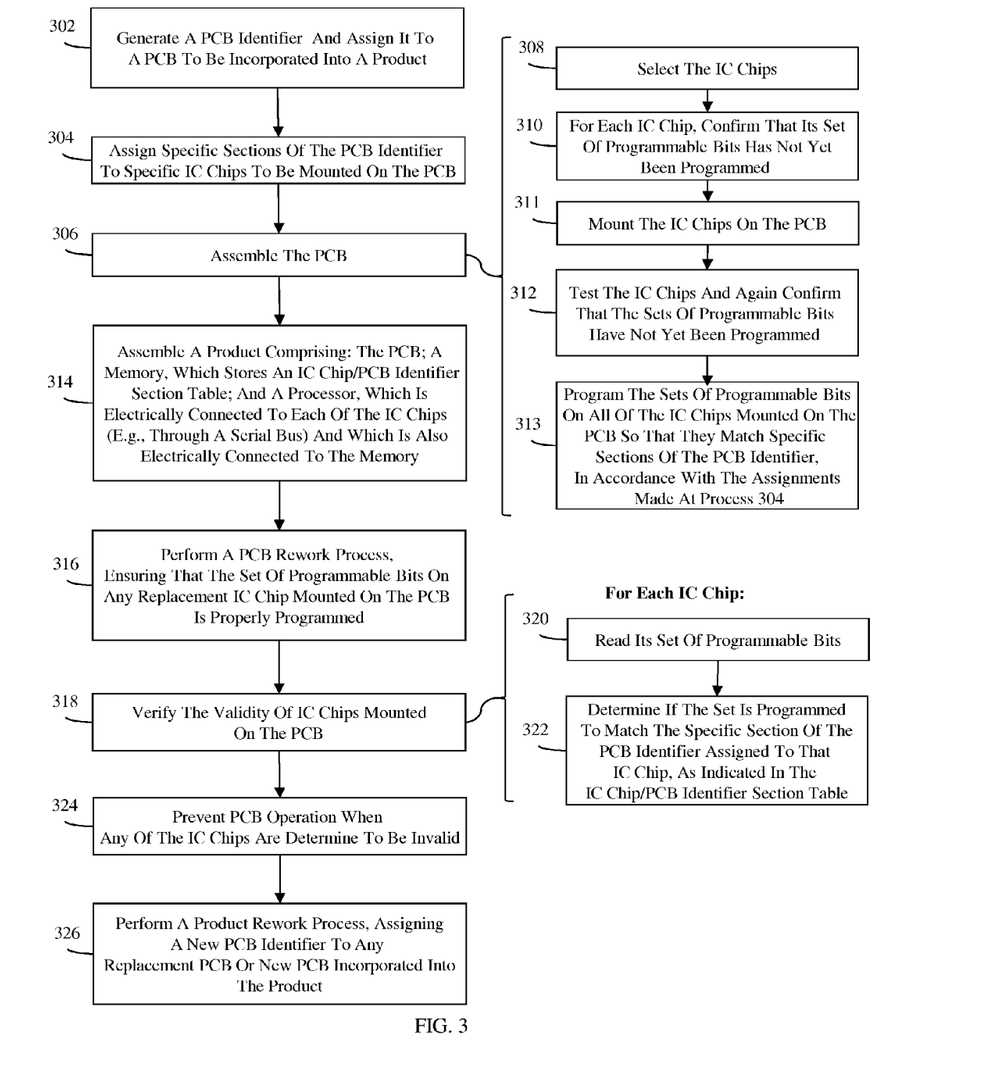
FIG. 3 is a flow diagram illustrating a method that prevents incorporation of a previously used integrated circuit chip into a product in order to ensure product reliability; and, FIG. 4 is another flow diagram illustrating a method that prevents incorporation of a previously used integrated circuit chip into a product in order to ensure product reliability.
Figure 4:
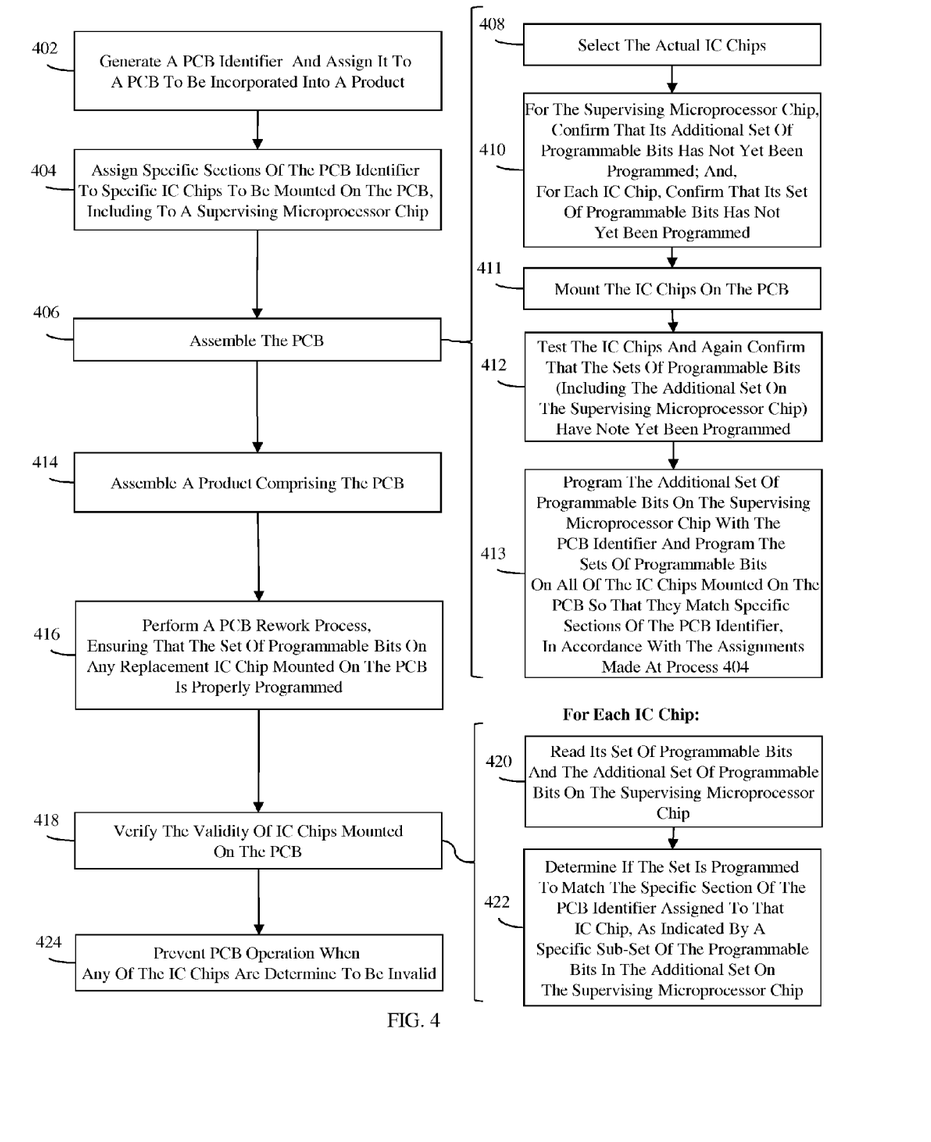

Referring to the flow diagrams of FIGS. 3 and 4, also disclosed herein are different methods that correspond to the above-described systems 100 of FIG. 1 and 200 of FIG. 2, respectively, and that prevent incorporation of a previously used integrated circuit chip into a product, either initially or during printed circuit board (PCB) rework, in order to ensure product reliability. Each of these methods comprise assembling a product. The product can incorporate a printed circuit board (PCB), which has one or more integrated circuit chips mounted thereon. The integrated circuit chips can comprise corresponding sets of programmable bits. Each of the methods can further comprise verifying the validity of all of the integrated circuit chips on the PCB by performing the following, for each specific integrated circuit chip on the printed circuit board: reading a corresponding set of programmable bits on the specific integrated circuit chip; and, then determining whether the corresponding set of programmable bits has been programmed to match a specific section of an identifier of the printed circuit board.

More particularly, referring to the flow diagram of FIG. 3 in combination with the system diagram of FIG. 1, this method can comprise receiving a design for a product 110. This product 110 can incorporate: a memory 140 (e.g., a non-volatile memory); at least one printed circuit board (PCB) 120 (e.g., a motherboard or other PCB) comprising at least one integrated circuit chip (e.g., see multiple integrated circuit chips 121-1 to 121-N); and, a processor 150, which is a component of the product and separate from the PCB 120. The product 110 can, for example, be any end product. For purposes of this disclosure, an end product can be any product that comprises a PCB with integrated circuit chip(s) mounted thereon, a memory, a processor, etc. Such end products can, for example, range from toys and other low-end applications to advanced computer products having a display, a keyboard or other input device, a central processing unit (CPU), etc. The PCB 120 can comprise any number of two or more integrated circuit chips 121-1 to 121-N.

Prior to or during assembly of the PCB 120 for the product 110, a PCB identifier 130 can be generated and assigned to the PCB 120 (302). This PCB identifier 130 can comprise a random number generated, for example, by a random number generator. The random number can comprise multiple digits up to a predetermined place number (i.e., a set number of places). It should be noted that, in practice, multiple PCB identifiers could be randomly generated and forwarded to the product manufacturer (e.g., prior to any PCB assembly). These PCB identifiers can all be unique and can be stored in the memory 140 for subsequent assignment to a PCB that will be assembled and incorporated into a product initially or at some time in the future (e.g., during product rework, as discussed in greater detail below).

In any case, prior to or during assembly of the specific PCB 120 for the product 110, a specific PCB 130 can be assigned to that specific PCB 120. Also, prior to or during assembly of the PCB 120 for the product 110, specific sections of the PCB identifier 130 (with a lesser predetermined place number) can be assigned (e.g., in sequence) to each of the multiple integrated circuit chips 121-1 to 121-N on the PCB 120 (304). For example, the first x number of digits in the PCB identifier 130 can be assigned to the first integrated circuit chip 121-1 on the PCB 120, the second x number of digits in the PCB identifier 130 can be assigned to the second integrated circuit chip 121-2 on the PCB 120, and so on. It should be understood that the predetermined place number for the PCB identifier 130 must be a place number that is sufficiently large enough to allow section assignment to each of the integrated circuit chips. In any case, each digit in the random number of the PCB identifier 130 can be a binary digit. Alternatively, each digit in the random number of the PCB identifier 130 can comprise a non-binary digit (e.g., 0-9).

The method can further comprise generating an integrated circuit chip/PCB identifier section table 131. This integrated circuit chip/PCB identifier section table 131 can represent the assignments made at process 304. That is, this integrated circuit chip/PCB identifier section table 131 can associate specific sections of the PCB identifier 130 with specific integrated circuit chips 121-1 to 121-N, as assigned at process 304. The process of generating the integrated circuit chip/PCB identifier section table 131 can be performed any time after the assignments are made at process 304 and before the product is assembled at process 314, as discussed in detail below.

The method can further comprise assembling the PCB 120 (306). Specifically, the actual integrated circuit chips 121-1 to 121-N to be mounted on the PCB 120 can be selected based on the design of the product 110 (308). The integrated circuit chips 121-1 to 121-N can be in the form of bare integrated circuit chips (i.e., bare dice) or in the form of packaged integrated circuit chips (i.e., chip modules) and can have various different functions within the product 110. Regardless of those functions, the integrated circuit chips 121-1 to 121-N can comprise corresponding sets 122-1 to 122-N of programmable bits. The programmable bits can comprise single-use programmable bits (e.g., fuses, anti-fuses, or any other suitable programmable bits). During PCB assembly, each integrated circuit chip 121-1 to 121-N selected to be mounted on the PCB 120 can be physically evaluated to confirm that its corresponding set of programmable bits 122-1 to 122-N has not yet been programmed (i.e., remains un-programmed) (310). It should be understood that by confirming that the corresponding set of programmable bits on an integrated circuit chip has not yet been programmed, the method confirms that the integrated circuit chip has not been previously used. If, during this process, any integrated circuit chip is found to have an already programmed set of programmable bits, then that integrated circuit chip is considered previously used, should be discarded and should be replaced with another integrated circuit chip. Following confirmation that the sets of programmable bits 122-1 to 122-N have not yet been programmed, the integrated circuit chips 121-1 to 121-N can be mounted on the PCB 120 (311). Mounting the integrated circuit chips 121-1 to 121-N on the PCB 120 can, for example, include serially connecting the integrated circuit chips 121-1 to 121-N with a serial bus 160, as shown. After the integrated circuit chips 121-1 to 121-N are mounted on the PCB 120, each integrated circuit chip 121-1 to 121-N on the PCB 120 can be tested for proper functioning as well as physically evaluated to again confirm that its corresponding set of programmable bits 122-1 to 122-N has not yet been programmed (i.e., remains un-programmed) (312). If, during this process, any integrated circuit chip is found to function improperly or to have an already programmed set of programmable bits, then that integrated circuit chip should be discarded and should be replaced with another integrated circuit chip. Once all integrated circuit chips on the PCB 120 are confirmed to be functioning properly and with their sets of programmable bits being as of yet un-programmed, the corresponding sets 122-1 to 122-N of programmable bits on those integrated circuit chips can be programmed to match specific sections of the PCB identifier 130, in accordance with the assignments made at process 304 (313).

Thus, during PCB assembly, each specific set 122-1 to 122-N of programmable bits on each specific integrated circuit chip 121-1 to 121-N mounted on the PCB 120 will be programmed at process 313 to match the specific section of the PCB identifier 130 that was assigned to that specific integrated circuit chip 121-1 to 121-N at process 304. Those skilled in the art will recognize that in the case of a set of fuses such programming involves blowing certain ones of the fuses in the set (i.e., breaking the electrical connection in certain ones of the fuses in the set), thereby changing the value of those fuses, when read, from a first value (e.g., a "0" value) to a second value (e.g., a "1" value). Contrarily, in the case of a set of anti-fuses such programming involves breaking down dielectric material in certain ones of the anti-fuses in the set to establish an electrical connection, thereby changing the values of those anti-fuses, when read, from a first value (e.g., a "1" value) to a second value (e.g., a "0" value). Additionally, those skilled in the art will recognize that, if the digits in the PCB identifier 130 are binary digits, each programmable bit (i.e., each fuse, anti-fuse or other programmable bit) within the set of programmable bits on an integrated circuit chip can correspond to a specific digit in the the section of the PCB identifier 130 assigned to that integrated circuit chip. However, if the digits in the PCB identifier 130 are non-binary digits (e.g., 0-9), groups of programmable bits (i.e., groups of fuses, anti-fuses or other suitable programmable bits) within the set of programmable bits on an integrated circuit chip can correspond to a specific digit in the section of the PCB identifier 130 assigned to that integrated circuit chip so that, when the values of a group of programmable bits corresponding to the specific digit are read, those values indicate the total value of the non-binary digit in the PCB identifier 130. It should be noted that, at process 312, if the set of programmable bits on any integrated circuit chip could not be properly programmed for any reason, the integrated circuit chip can be discarded and replaced with another integrated circuit chip and the set of programmable bits.

After the PCB 120 is assembled, the product 110 with the PCB 120, memory 140, processor 150, etc. can be assembled (314). The process of assembling the product 110 can comprise electrically connecting the processor 150 to the memory 140 and further electrically connecting the processor 150 to each of the multiple integrated circuit chips 121-1 to 121-N on the PCB 120 (e.g., through the serial bus 160 or, alternatively, through discrete buses (not shown)). Additionally, the process of assembling the product 110 can comprise storing the PCB identifier 130 in the memory 140 (optional) and also storing the integrated circuit chip/PCB identifier section table 131 in the memory 140.

As discussed above, oftentimes previously used integrated circuit chips are accidently or surreptitiously incorporated into a product, either initially or during printed circuit board (PCB) rework. In order to prevent operation of the product 110 with a previously used integrated circuit chip, the method disclosed herein can comprise verifying the validity of the integrated circuit chips 121-1 to 121-N one or more times during the product's useful life (318). Such verification can be performed by the processor 150 either automatically (e.g., whenever the product 110 is powered on, whenever the PCB 120 is power-on, at a set number of power-on-hours (POHs) of either the product 110 or the PCB 120, etc.) or on-demand (e.g., in response to a command input by a user through a user interface of the product 110).

In any case, verification of the validity of all of the multiple integrated circuit chips 121-1 to 121-N on the PCB 120 can be performed at process 318 using the integrated circuit chip/PCB identifier section table 131, as follows. For each specific integrated circuit chip on the PCB 120, the corresponding set of programmable bits on the specific integrated circuit chip can be read by the processor 150 (320). Then, a determination can be made by the processor 150 as to whether or not the corresponding set of programmable bits of that specific integrated circuit chip is indeed programmed to match a specific section of the identifier, as indicated by the integrated circuit chip/PCB identifier section table 131 (i.e., by comparing the values read from the corresponding set of programmable bits to the section of the PCB identifier assigned to the specific integrated circuit chip, as indicated in the table 131, to see if they match) (322). If so, the specific integrated circuit chip can be considered valid. If not, the specific integrated circuit chip can be considered invalid. The processes 320-322 can be repeated by the processor 150 for each of the integrated circuit chips 121-1 to 121-N on the PCB 120. That is, the set 122-1 of programmable bits on integrated circuit chip 121-1 can be read and a comparison process can be performed to to determine whether or not that set 122-1 of programmable bits is indeed programmed to match the section of the PCB identifier 130 that was assigned to the integrated circuit chip 121-1 (e.g., the first x number of digits of the PCB identifier 130), as indicated by the integrated circuit chip/PCB identifier section table 131. If so, the integrated circuit chip 121-1 can be considered valid. If not, the integrated circuit chip 121-1 can be considered invalid. Next, the set 122-2 of programmable bits on integrated circuit chip 121-2 can be read and a comparison process can be performed to determine whether or not that set 122-2 of programmable bits is indeed programmed to match the section of the PCB identifier 130 that was assigned to the integrated circuit chip 121-2 (e.g., the second x number of digits of the PCB identifier 130), as indicated by the integrated circuit chip/ PCB identifier section table 131. If so, the integrated circuit chip 121-2 can be considered valid. If not, the integrated circuit chip 121-2 can be considered invalid. Next, the set 122-3 of programmable bits on integrated circuit chip 121-3 can be read and a comparison process can be performed to determine whether or not that set 122-3 of programmable bits is indeed programmed to match the section of the PCB identifier 130 that was assigned to the integrated circuit chip 121-3 (e.g., the third x number of digits of the PCB identifier 130), as indicated by the integrated circuit chip/PCB identifier section table 131, and so on.

Operation of the PCB 120 can subsequently be controlled, again by the processor 150, based on the results of the integrated circuit chip validity verification process (i.e., depending upon whether or not the integrated circuit chips 121-1 to 121-N are determined to be valid or invalid). Specifically, when all of the multiple integrated circuit chips 121-1 to 121-N on the PCB 120 are determined to be valid, operation of the PCB 120 can be allowed by the processor 150. However, when any of the multiple integrated circuit chips 121-1 to 121-N on the PCB 120 are determined to be invalid, operation of the PCB 120 can be prohibited (i.e., prevented) by the processor 150 (324) and, optionally, a user can be notified by the processor 150 of the invalid integrated circuit chip(s). Notification of invalid integrated circuit chip(s) can, for example, be generated locally at the product itself (e.g., a message on graphic user interface (GUI) of the product). Alternatively, notification of invalid integrated circuit chip(s) can be communicated (e.g., over local area network or wide area) to a remote system administrator.

It should be understood that in this method, after product assembly at process 314 and during the course of the product's useful life, the PCB 120 can be reworked and, particularly, any of the integrated circuit chips on the PCB 120 can be replaced, if necessary (e.g., if faulty) (316). However, in order to ensure that the replacement integrated circuit chip (e.g., integrated circuit chip 121-3) is not a previously used integrated circuit chip and to further ensure that the replacement integrated circuit chip is determined to be valid during any subsequent verification process, the following processes can be performed. Specifically, the replacement integrated circuit chip (i.e., the integrated circuit chip selected to replace a previously removed integrated circuit chip during a rework process) can be physically evaluated to confirm that its set of programmable bits has not yet been programmed (i.e., remains un-programmed). If the set of programmable bits is un-programmed, the replacement integrated circuit chip can be mounted on the PCB 120 at the location of the previously removed integrated circuit chip. However, if the set of programmable bits is already programmed, indicating that the replacement integrated circuit chip has been previously used, the replacement integrated circuit chip will be discarded and another replacement integrated circuit chip will be selected for use. After a replacement integrated circuit chip has been mounted on the PCB 120, its set of programmable bits can be programmed so that the replacement integrated circuit chip and the previously removed integrated circuit chip (i.e., the integrated circuit chip being replaced) have matching programmed sets of programmable bits and, thus, so that the set of programmable bits on the replacement integrated circuit chip match the correct specific section of the PCB identifier 130, as indicated by the integrated circuit chip/PCB identifier section table 131.

It should further be understood that this method, not only prevents previously used integrated circuit chips from being accidently or surreptitiously mounted on a PCB of a product during PCB rework, but also prevents a previously used PCB from being accidently or surreptitiously incorporated into the product 110 itself during product rework (326). That is, during product rework at process 326, a new printed circuit board (new PCB) can be used to replace a faulty PCB and/or simply added to the product 110 design and this new PCB can be assigned a new PCB identifier. For example, as mentioned above, multiple PCB identifiers, including unassigned PCB identifiers, can be stored in memory 140 and the new PCB identifier can be selected from the previously unassigned PCB identifiers. Alternatively, a new PCB identifier can be generated (e.g., by the processor) and stored in the memory 140. In any case, this new PCB identifier can be assigned to the new PCB. Once the new PCB identifier is assigned to the new PCB, specific integrated circuit chips on the new PCB can be further assigned specific sections of the new PCB identifier and a new integrated circuit chip/PCB identifier section table can further be generated and stored in the memory 140, in the same manner as described above during initial PCB and product assembly at processes 304-314.

Referring to the flow diagram of FIG. 4 in combination with the system diagram of FIG. 2, this method can comprise receiving a design for a product 210. This product 210 can incorporate at least one printed circuit board (PCB) 220 (e.g., a motherboard or other PCB) comprising multiple integrated circuit chips 221-1 to 221-N with one of these multiple integrated circuit chips (e.g., IC chip 221-1) being a supervising microprocessor chip that is electrically connected to all others of the multiple integrated circuit chips (e.g., to IC chips 221-2 to 221-N) through a serial bus 260 (as shown) or directly through discrete buses (not shown). The product 210 can, for example, be any end product. For purposes of this disclosure, an end product can be any product that comprises a PCB with integrated circuit chips mounted thereon, a memory, a processor, etc. Such end products can, for example, range from toys and other low-end applications to advanced computer products having a display, a keyboard or other input device, a central processing unit (CPU), etc. The PCB 220 can comprise any number of two or more integrated circuit chips 221-1 to 221-N.

Prior to or during assembly of the PCB 220 for the product 210, a PCB identifier can be generated and assigned to the PCB 220 (402). This PCB identifier can comprise a random number generated, for example, by a random number generator. The random number can comprise multiple digits up to a predetermined place number (i.e., a set number of places).

It should be noted that, in practice, multiple PCB identifiers could be randomly generated and forwarded to the product manufacturer (e.g., prior to any PCB assembly). These PCB identifiers can all be unique and can be used for subsequent assignment to a PCB that will be assembled and incorporated into the product initially or at some time in the future (e.g., during product rework).

In any case, prior to or during assembly of the specific PCB 220 for the product 210, a specific PCB identifier can be assigned to that specific PCB 220. Also, prior to or during assembly of the PCB 220 for the product 210, specific sections of the PCB identifier (with a lesser predetermined place number) can be assigned (e.g., in sequence) to each of the multiple integrated circuit chips 221-1 to 221-N, including the supervising microprocessor chip 221-1, on the PCB 220 (404). For example, the first x number of digits in the PCB identifier can be assigned to the first integrated circuit chip 221-1 (i.e., to the supervising microprocessor chip) on the PCB 220, the second x number of digits in the PCB identifier can be assigned to the second integrated circuit chip 221-2 on the PCB 220, and so on. It should be understood that the predetermined place number for the PCB identifier must be a place number that is sufficiently large enough to allow section assignment to each of the integrated circuit chips. In any case, each digit in the random number of the PCB identifier can be a binary digit. Alternatively, each digit in the random number of the PCB identifier can comprise a non-binary digit (e.g., 0-9).

The method can further comprise assembling the PCB 220 (406). Specifically, the actual integrated circuit chips 221-1 to 221-N to be mounted on the PCB 220 can be selected based on the design of the product 210 (408). These integrated circuit chips 221-1 to 221-N can be in the form of bare integrated circuit chips (i.e., bare dice) or in the form of packaged integrated circuit chips (i.e., chip modules) and can have various different functions within the product 210. Regardless of those functions, all of the integrated circuit chips 221-1 to 221-N, including the supervising microprocessor chip 221-1, can comprise corresponding sets 222-1 to 222-N of programmable bits. The supervising microprocessor chip 221-1 can further comprise an additional set 223 of programmable bits. The programmable bits can comprise single-use programmable bits (e.g., fuses, anti-fuses or other suitable programmable bits). During PCB assembly, all of the integrated circuit chips 221-1 to 221-N selected to be mounted on the PCB 220, including the supervising microprocessor chip 221-1, can be physically evaluated to confirm that their corresponding sets 222-1 to 222-N of programmable bits have not yet been programmed (i.e., remain un-programmed) (410). At process 410, the supervising microprocessor chip 221-1 can be further evaluated to confirm that its additional set 223 of programmable bits also has not yet been programmed (i.e., also remains un-programmed). Following process 410, the integrated circuit chips 222-1 to 222-N can be mounted on the PCB 220 (411). Mounting the integrated circuit chips 221-1 to 221-N on the PCB 220 can, for example, include serially connecting the integrated circuit chips 221-1 to 221-N with a serial bus 260, as shown. After the integrated circuit chips 221-1 to 221-N are mounted on the PCB 220, each integrated circuit chip 221-1 to 221-N on the PCB 220 can be tested for proper functioning as well as physically evaluated to again confirm that the corresponding sets 222-1 to 222-N of programmable bits on each chip 221-1 to 221-N, respectively, and the additional set 223 of programmable bits on the supervising microprocessor chip 221-1 have not yet been programmed (i.e., remain un-programmed) (412). If, during this process, any integrated circuit chip is found to function improperly or to have an already programmed set of programmable bits, then that integrated circuit chip should be discarded and should be replaced with another integrated circuit chip. Once all integrated circuit chips on the PCB 220 are confirmed to be functioning properly and with their sets of programmable bits being as of yet un-programmed, the additional set 223 of programmable bits on the supervising microprocessor chip 221-1 can be programmed to match the PCB identifier and the corresponding sets 222-1 to 222-N of programmable bits on all of the integrated circuit chips 221-1 to 221-N can be programmed to match specific sections of the PCB identifier, in accordance with the assignments made at process 404 (see the sub-sets 223-1 to 223-N of programmable bits in the additional set 223 of programmable bits which correspond to the different sections, in sequence, of the PCB identifier that were assigned to the specific integrated circuit chips 221-1 to 221-N) (412).

Thus, during PCB assembly, the additional set 223 of programmable bits on the supervising microprocessor chip 221-1 will be programmed at process 413 to match the entire PCB identifier and the specific sets 222-1 to 222-N of programmable bits on the specific integrated circuit chips 221-1 to 221-N (including the supervising microprocessor chip 221-1) will be programmed at process 412 to match, in sequence, specific sections of that same PCB identifier such that programming of the sub-sets 223-1 to 223-N of programmable bits in the additional set 223 of programmable bits will match the programming of the specific sets 222-1 to 222-N of programmable bits on the integrated circuit chips 221-1 to 221-N, respectively. Those skilled in the art will recognize that in the case of a set of fuses such programming involves blowing certain ones of the fuses in the set (i.e., breaking the electrical connection in certain ones of the fuses in the set), thereby changing the value of those fuses, when read, from a first value (e.g., a "0" value) to a second value (e.g., a "1" value). Contrarily, in the case of a set of anti-fuses such programming involves breaking down dielectric material in certain ones of the anti-fuses in the set to establish an electrical connection, thereby changing the values of those anti-fuses, when read, from a first value (e.g., a "1" value) to a second value (e.g., a "0" value). Additionally, those skilled in the art will recognize that, if the digits in the PCB identifier (which is programmed into the additional set 223 of programmable bits) are binary digits, each programmable bit (i.e., each fuse, anti-fuse or other suitable programmable bit) within the set of programmable bits on an integrated circuit chip can correspond to a specific digit in the the section of the PCB identifier assigned to that integrated circuit chip. However, if the digits in the PCB identifier are non-binary digits (e.g., 0-9), groups of programmable bits (i.e., groups of fuses, anti-fuses, or other suitable programmable bits) within the set of programmable bits on an integrated circuit chip can correspond to a specific digit in the section of the PCB identifier assigned to that integrated circuit chip so that, when the values of a group of programmable bits corresponding to the specific digit are read, those values indicate the total value of the non-binary digit in the PCB identifier. It should be noted that, at process 412, if the set of programmable bits on any integrated circuit chip could not be properly programmed for any reason, the integrated circuit chip can be discarded and replaced with another integrated circuit chip and the set of programmable bits on this integrated circuit chip can be programmed accordingly.

After the PCB 220 is assembled, the product 210 comprising the PCB 220 can be assembled (414).

As discussed above, oftentimes previously used integrated circuit chips are accidently or surreptitiously incorporated into a product, either initially or during printed circuit board (PCB) rework. In order to prevent operation of the product 210 with a previously used integrated circuit chip, the method disclosed herein can comprise verifying the validity of the integrated circuit chips 221-1 to 221-N one or more times during product's useful life (418). Such verification can be performed by the supervising microprocessor chip 221-1 either automatically (e.g., whenever the product 210 is powered on, whenever the PCB 220 is power-on, at a set number of power-on-hours (POHs) of either the product 210 or the PCB 220, etc.) or on-demand (e.g., in response to a command input by a user through a user interface of the product).

In any case, verification of the validity of all of the multiple integrated circuit chips 221-1 to 221-N on the PCB 220 can be performed at process 418 as follows. For each specific integrated circuit chip on the PCB 220, the corresponding set of programmable bits on the specific integrated circuit chip, along with the additional set 223 of programmable bits on the supervising microprocessor chip 221-1, can be read by the supervising microprocessor chip 221-1 (420). Then, a determination can be made by the supervising microprocessor chip 221-1 as to whether or not the corresponding set of programmable bits on the specific integrated circuit chip is indeed programmed to match a specific section of the PCB identifier, as indicated by a specific sub-set of programmable bits within the additional set 223 of the programmable bits on the supervising microprocessor chip 221-1 (i.e., by comparing the values read from the corresponding set of programmable bits to the values read from the specific sub-set of programmable bits in the additional set 223 of programmable bits) (422). That is, the set 222-1 of programmable bits on the first integrated circuit chip 221-1 and the additional set 223 of programmable bits also on that same first integrated circuit chip 221-1 (which is the supervising processor chip) can be read and a comparison process can be performed to determine whether or not the set 222-1 of programmable bits is indeed programmed to match the section of the PCB identifier that was assigned to the integrated circuit chip 221-1, as indicated by the first sub-set 223-1 of programmable bits in the additional set 223 (i.e., as indicated by the first x number of digits programmed into the additional set 223). If so, the integrated circuit chip 221-1 can be considered valid. If not, the integrated circuit chip 221-1 can be considered invalid. Next, the set bits 222-2 of programmable bits on integrated circuit chip 221-2 and the additional set 223 of programmable bits can be read and a comparison process can be performed to determine whether or not the set 222-2 of programmable bits is indeed programmed to match the section of the PCB identifier that was assigned to the integrated circuit chip 221-2, as indicated by the second sub-set 223-2 of programmable bits in the additional set 223 (i.e., as indicated by the second x number of digits programmed into the additional set 223). If so, the integrated circuit chip 221-2 can be considered valid. If not, the integrated circuit chip 221-2 can be considered invalid. Next, the set 222-3 of programmable bits on integrated circuit chip 221-3 and the additional set 223 of programmable bits can be read and a comparison process can be performed to determine whether or not the set 222-3 of programmable bits is indeed programmed to match the section of the PCB identifier that was assigned to the integrated circuit chip 221-3, as indicated by third sub-set 223-3 of programmable bits in the additional set 223 (i.e., as indicated by the third x number of digits programmed into the additional set 223), and so on.

Operation of the PCB 220 can subsequently be controlled, again by the supervising microprocessor chip 221-1, based on the results of the integrated circuit chip validity verification process (i.e., depending upon whether or not the integrated circuit chips 221-1 to 221-N are determined to be valid or invalid). Specifically, when all of the multiple integrated circuit chips 221-1 to 221-N on the PCB 220 are determined to be valid, operation of the PCB 220 can be allowed by the supervising microprocessor chip 221-1. However, when any of the multiple integrated circuit chips 221-1 to 221-N on the PCB 220 are determined to be invalid, operation of the PCB 120 can be prohibited (i.e., prevented) by supervising microprocessor chip 221-1 (424) and, optionally, a user can be notified by the supervising microprocessor chip 221-1 of the invalid integrated circuit chip(s). Notification of invalid integrated circuit chip(s) can, for example, be generated locally at the product itself (e.g., a message on graphic user interface (GUI) of the product). Alternatively, notification of invalid integrated circuit chip(s) can be communicated (e.g., over local area network or wide area) to a remote system administrator.

It should be understood that in this method, after product assembly at process 414 and during the course of the product's useful life, the PCB 220 can be reworked and, particularly, any of the integrated circuit chips on the PCB 220 can be replaced, if necessary (e.g., if faulty) (416). However, in order to ensure that the replacement integrated circuit chip (e.g., integrated circuit chip 221-3) is not a previously used integrated circuit chip and to further ensure that the replacement integrated circuit chip is subsequently determined to be valid, the following processes can be be performed. Specifically, the replacement integrated circuit chip (i.e., the integrated circuit chip selected to replace a previously removed integrated circuit chip during a rework process) can be physically evaluated to confirm that its set of programmable bits has not yet been programmed (i.e., remains un-programmed). If the set of programmable bits is un-programmed, the replacement integrated circuit chip can be mounted on the PCB 220 at the location of the previously removed integrated circuit chip. However, if the set of programmable bits is already programmed, indicating that the replacement integrated circuit chip has been previously used, the replacement integrated circuit chip will be discarded and another replacement integrated circuit chip will be selected for use. After a replacement integrated circuit chip has been mounted on the PCB 220, its set of programmable bits can be programmed so that the replacement integrated circuit chip and the previously removed integrated circuit chip (i.e., the integrated circuit chip being replaced) have matching programmed sets of programmable bits and, thus, so that the set of programmable bits on the replacement integrated circuit chip match the correct specific section of the PCB identifier, as indicated by the corresponding sub-set 223-3 of programmable bits in the additional set 223.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/ or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed above are systems and methods that prevent incorporation of a previously used integrated circuit chip into a product, either initially or during printed circuit board (PCB) rework, in order to ensure product reliability. In these systems and methods, an identifier can be generated for a printed circuit board (PCB), integrated circuit chips can be electrically connected to the PCB, and corresponding sets of programmable bits on the integrated circuit chips can be programmed to match specific sections of the identifier. Due to the generation of the identifier for the PCB and the programming of the corresponding sets of programmable bits on the integrated circuit chips to match specific sections of the identifier, the validity of the integrated circuit chips can be verified at any time during the life of a product that incorporates the PCB. For example, for each specific integrated circuit chip, its set of programmable bits can be read (e.g., by a processor also incorporated into the product separate from the PCB or by a supervisory microprocessor chip also on the PCB, depending upon the embodiment) and, then, a determination can be made as to whether that set of programmable bits is indeed programmed to match a specific section of the identifier. Operation of the PCB can be allowed when all of the multiple integrated circuit chips are determined to be valid and prohibited when any of the integrated circuit chips are determined to be invalid.

What is claimed is:

1. A system comprising:
a product;
a memory;
a printed circuit board comprising multiple integrated circuit chips, said multiple integrated circuit chips having corresponding sets of programmable bits; and,
a processor electrically connected to said memory and to said multiple integrated circuit chips,
said memory, said printed circuit board and said processor each being incorporated into said product,
said memory storing a table that associates specific sections of an identifier for said printed circuit board with specific integrated circuit chips on said printed circuit board, and
said processor verifying validity of all of said multiple integrated circuit chips on said printed circuit board by performing the following, for each specific integrated circuit chip on said printed circuit board:
reading a corresponding set of programmable bits on said specific integrated circuit chip; and,
determining whether said corresponding set of programmable bits is programmed to match a specific section of said identifier, said specific section being associated in said table with said specific integrated circuit chip.

2. The system of claim 1, said programmable bits comprising any of fuses and anti-fuses.

3. The system of claim 1, said multiple integrated circuit chips comprising any of bare integrated circuit chips and packaged integrated circuit chips.

4. The system of claim 1, said processor further allowing operation of said printed circuit board when all of said multiple integrated circuit chips are determined to be valid and preventing operation of said printed circuit board when any of said multiple integrated circuit chips are determined to be invalid.

5. The system of claim 1, said printed circuit board further comprising a replacement integrated circuit chip that replaced a previously removed integrated circuit chip, said replacement integrated circuit chip and said previously removed integrated circuit chip having matching programmed sets of programmable bits.

6. The system of claim 1, said processor being electrically connected to said multiple integrated circuit chips through a serial bus.

7. A system comprising:
a product; and
a printed circuit board incorporated into said product, said printed circuit board comprising multiple integrated circuit chips with one of said multiple integrated circuit chips being a supervising microprocessor chip electrically connected to all others of said multiple integrated circuit chips,
said multiple integrated circuit chips comprising corresponding sets of programmable bits,
said supervising microprocessor chip further comprising an additional set of programmable bits programmed with an identifier for said printed circuit board, and
said supervising microprocessor chip verifying validity of all of said multiple integrated circuit chips on said printed circuit board by performing the following, for each specific integrated circuit chip on said printed circuit board:
reading a corresponding set of programmable bits on said specific integrated circuit chip; and,
determining whether said corresponding set of programmable bits is programmed to match a specific section of said identifier, said specific section being associated with said specific integrated circuit chip.

8. The system of claim 7, said programmable bits comprising any of fuses and anti-fuses.

9. The system of claim 7, said multiple integrated circuit chips comprising any of bare integrated circuit chips and packaged integrated circuit chips.

10. The system of claim 7, said supervising microprocessor chip further allowing operation of said printed circuit board when all of said multiple integrated circuit chips are determined to be valid and preventing operation of said printed circuit board when any of said multiple integrated circuit chips are determined to be invalid.

11. The system of claim 7, said printed circuit board further comprising a replacement integrated circuit chip that replaced a previously removed integrated circuit chip, said replacement integrated circuit chip and said previously removed integrated circuit chip having matching programmed sets of programmable bits.

12. The system of claim 7, said supervising microprocessor chip being electrically connected to said all others of said multiple integrated circuit chips through a serial bus.

13. A method comprising:
assembling a product comprising a printed circuit board, said printed circuit board comprising multiple integrated circuit chips, and
said multiple integrated circuit chips comprising corresponding sets of programmable bits; and,
verifying validity of all of said multiple integrated circuit chips on said printed circuit board by performing the following, for each specific integrated circuit chip on said printed circuit board:
reading a corresponding set of programmable bits on said specific integrated circuit chip; and,
determining whether said corresponding set of programmable bits has been programmed to match a specific section of an identifier of said printed circuit board.

14. The method of claim 13, further comprising:
generating said identifier;
assembling said printed circuit board by electrically connecting said multiple integrated circuit chips to said printed circuit board;
generating a table associating specific sections of said identifier with specific integrated circuit chips on said printed circuit board; and,
after said assembling of said printed circuit board, programming said corresponding sets of programmable bits in said specific integrated circuit chips to match said specific sections of said identifier,
said assembling of said product being performed such that said product comprises said printed circuit board, a memory storing said table and a processor electrically connected to said memory and to each of said multiple integrated circuit chips, and
said verifying being performed by said processor using said table in said memory.

15. The method of claim 14, further comprising, after said assembling of said product, reworking said printed circuit board, said reworking comprising:
- mounting a replacement integrated circuit chip on said printed circuit board to replace a previously removed integrated circuit chip, said replacement integrated circuit chip having an un-programmed set of programmable bits; and,
- programming said un-programmed set of programmable bits on said replacement integrated circuit chip so that said replacement integrated circuit chip and said previously removed integrated circuit chip have matching programmed sets of programmable bits.

16. The method of claim 13, further comprising:
generating said identifier;
- assembling said printed circuit board by electrically connecting said multiple integrated circuit chips to said printed circuit board such that one of said multiple integrated circuit chips comprises a supervising microprocessor chip electrically connected to all others of said multiple integrated circuit chips, said supervising microprocessor chip further comprising an additional set of programmable bits; and,
- after said assembling of said printed circuit board, programming said additional set of programmable bits of said supervising microprocessor chip with said identifier and further programming said corresponding sets of programmable bits in specific integrated circuit chips to match specific sections of said identifier, respectively,
said verifying being performed by said supervising microprocessor chip.

17. The method of claim 16, further comprising, after said assembling of said product, reworking said printed circuit board, said reworking of said printed circuit board comprising:
- mounting a replacement integrated circuit chip on said printed circuit board to replace a previously removed integrated circuit chip, said replacement integrated circuit chip having an un-programmed set of programmable bits; and,
- programming said un-programmed set of programmable bits on said replacement integrated circuit chip so that said replacement integrated circuit chip and said previously removed integrated circuit chip have matching programmed sets of programmable bits.

18. The method of claim 13, said programmable bits comprising any of fuses and anti-fuses and said multiple integrated circuit chips comprising any of bare integrated circuit chips and packaged integrated circuit chips.

19. The method of claim 13, further comprising:
- allowing operation of said printed circuit board when all of said multiple integrated circuit chips are determined to be valid; and,
- preventing operation of said printed circuit board when any of said multiple integrated circuit chips are determined to be invalid.

20. The method of claim 14, further comprising, after said assembling of said product, reworking said product, said reworking of said product comprising incorporating one of a replacement printed circuit board and a new printed circuit board into said product and assigning a new printed circuit board identifier to said one of said replacement printed circuit board and said new printed circuit board.

* * * * *